United States Patent
Kang et al.

(10) Patent No.: US 7,313,037 B2
(45) Date of Patent: Dec. 25, 2007

(54) RFID SYSTEM INCLUDING A MEMORY FOR CORRECTING A FAIL CELL AND METHOD FOR CORRECTING A FAIL CELL USING THE SAME

(75) Inventors: Hee Bok Kang, Daejeongwangyeok-si (KR); Jin Hong Ahn, Gyeonggi-do (KR)

(73) Assignee: Hynix Semiconductor Inc., Icheon-Si (KR)

( * ) Notice: Subject to any disclaimer, the term of this patent is extended or adjusted under 35 U.S.C. 154(b) by 86 days.

(21) Appl. No.: 11/298,670

(22) Filed: Dec. 12, 2005

(65) Prior Publication Data
US 2006/0238310 A1    Oct. 26, 2006

(30) Foreign Application Priority Data
Apr. 21, 2005    (KR)    ............ 10-2005-0033318

(51) Int. Cl.
G11C 29/00    (2006.01)
(52) U.S. Cl. ............ 365/200; 365/185.09; 365/189.07; 365/201; 235/380; 235/492
(58) Field of Classification Search ............ 365/185.09
See application file for complete search history.

(56) References Cited

U.S. PATENT DOCUMENTS 5,742,618 A * 4/1998 Lowe .................. 714/797
6,362,738 B1 * 3/2002 Vega .................. 340/572.1
6,563,417 B1    5/2003 Shaw
6,636,998 B1 * 10/2003 Lee et al. .............. 714/735
6,674,674 B2 * 1/2004 Poechmueller .......... 365/200
2004/0124248 A1 * 7/2004 Selker ................. 235/492
2005/0007252 A1    1/2005 Ameson et al.
2005/0134463 A1    6/2005 Yamazaki

FOREIGN PATENT DOCUMENTS

| JP | 2000-020334 | 1/2000 |
| JP | 2002-111514 | 4/2002 |
| JP | 2004-259426 | 9/2004 |

* cited by examiner

Primary Examiner—Tan T. Nguyen
(74) Attorney, Agent, or Firm—Townsend and Townsend and Crew LLP (57) ABSTRACT

A radio frequency identification (RFID) system and a method for correcting a failed cell using the same are provided. The RFID system effectively corrects randomly distributed cell data by using a failed cell correcting circuit in a memory. In the RFID system, a predetermined number of unit cells are separated into one memory group, and the same data are stored in each memory group at a write mode. At a read mode, the cell data of the selected memory group are compared, and the same data are identified as effective data to improve yield of the RFID system.

20 Claims, 7 Drawing Sheets

RFID SYSTEM INCLUDING A MEMORY FOR CORRECTING A FAIL CELL AND METHOD FOR CORRECTING A FAIL CELL USING THE SAME

BACKGROUND OF THE INVENTION

1. Field of the Invention

The present invention generally relates to a radio frequency identification system (hereinafter, referred to as "RFID system") including a memory for correcting a failed cell and a method for correcting a failed cell using the same, and more specifically, effectively correcting randomly distributed cell data by using a failed cell correcting circuit in a memory of a RFID system to improve a yield of the RFID system.

2. Description of the Related Art

Generally, a ferroelectric random access memory (hereinafter, referred to as "FeRAM") has attracted considerable attention as the next generation memory device because it has a data processing speed as fast as a Dynamic Random Access Memory (hereinafter, referred to as 'DRAM') and preserves data even after the power is turned off.

The FeRAM having structures similar to the DRAM includes capacitors made of a ferroelectric substance, so that it utilizes the characteristic of a high residual polarization of the ferroelectric substance in which data is not deleted even after an electric field is eliminated.

The technical contents on the above FeRAM are disclosed in the Korean Patent Application No. 2001-57275 by the same inventor of the present invention. Therefore, the basic structure and the operation on the FeRAM are not described herein.

Meanwhile, the conventional FeRAM has a wide distribution map of cell data. In this case, cell data between "0" and "1" exists. As a result, when cell data is randomly distributed, it is difficult to repair a failed cell in a repair circuit and also to utilize cell data effectively.

Specifically, when a chip size is small like in a RFID system, it is difficult to test an embedded memory at the chip level. Accordingly, a test is performed at a RF tag level after high cost packaging is done. When a failed bit is found in a memory, the whole package is discarded and consequently causes high cost loss.

SUMMARY OF THE INVENTION

Various embodiments of the present invention are directed at comparing data of a plurality of unit cells in each group after the same data is written in the plurality of unit cells included to effectively correct cell data randomly distributed in a memory of a RFID system, thereby improving yield of the RFID system.

According to one embodiment of the present invention, a RFID system comprises an analog block adapted and configured to transmit and receive data to/from an external communication apparatus, a digital block adapted and configured to receive a power voltage and a signal for data transmission from the analog block, and to transmit a response signal to the analog block, and a memory adapted and configured to store the same data in each memory group consisting of a predetermined number of unit cells at a write mode, and to compare cell data of the memory group selected at a read mode to identify the same data as effective data.

According to one embodiment of the present invention, a method for correcting a failed cell of a RFID system comprises a writing step of writing the same data in a memory group including a predetermined number of unit memory cells, and a reading step of comparing data stored in the memory group to identify the same data as effective data.

BRIEF DESCRIPTION OF THE DRAWINGS

Other aspects and advantages of the present invention will become apparent upon reading the following detailed description and upon reference to the drawings in which.

DETAILED DESCRIPTION OF THE EXEMPLARY EMBODIMENTS

The present invention will be described in detail with reference to the accompanying drawings. Wherever possible, the same reference numbers will be used throughout the drawings to refer to the same or like parts.

Figure 1:
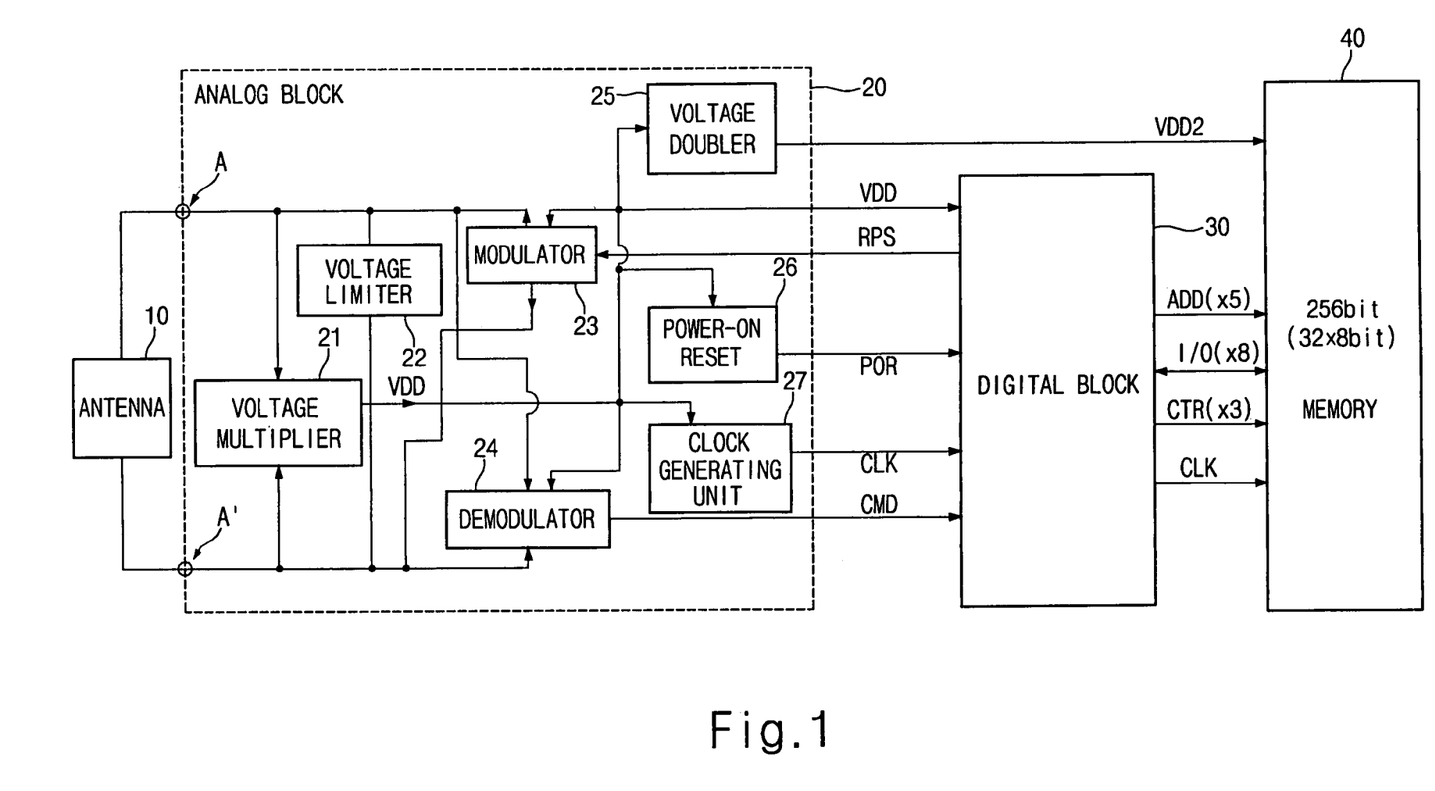
FIG. 1 is a diagram illustrating a RFID system according to an embodiment of the present invention.

FIG. 1 is a diagram illustrating a RFID system according to an embodiment of the present invention.

In this embodiment, a RFID comprises an antenna 10 an analog block 20, a digital block 30 and a memory 40.

The antenna 10 transmits and receives data to/from an external reader or writer.

The analog block 20 comprises a voltage multiplier 21, a voltage limiter 22, a modulator 23, a demodulator 24, a voltage doubler 25, a power-on reset 26, and a clock generating unit 27.

The voltage multiplier 21 generates a power source VDD of the RFID by a transmission frequency applied from the antenna 10. The voltage limiter 22 limits a transmission voltage in the transmission frequency to output the limited voltage to the demodulator 24.

The modulator 23 modulates a response signal "Response" applied from the digital block 30 to transmit the response signal "Response" to the antenna 10. The demodulator 24 detects an operating command signal at the transmission frequency applied from the antenna 10 depending on the power source VDD generated by the voltage multiplier 21 and the voltage limiter 22 to output a command signal CMD to the digital block 30.

The voltage doubler 25 boosts the power source VDD applied from the multiplier 21 to supply a boosting voltage VDD2 twice larger than the power source VDD to the memory 40. The power-on reset unit 26 senses the power source VDD to output a power-on reset signal "POR" for controlling a reset operation to the digital block 30. The clock generating unit 27 supplies a clock "CLK" for controlling the operation of the digital block 30 to the digital block 30 depending on the power source VDD.

The digital block 30 receives the power source VDD, a power-on reset signal "POR," the clock CLK and the command signal "CMD" to output the response signal "Response" to the analog block 20. The digital block 30 outputs an address ADD, input/output data I/O, a control signal "CTR" and the clock "CLK" to the memory 40.

The memory 40 further comprises a failed cell correcting circuit configured to correct a plurality of failed cells. As a result, normal data can be written/read through the failed cell correcting circuit even when a failed cell is generated in memory cells at a predetermined ratio.

Figure 2:
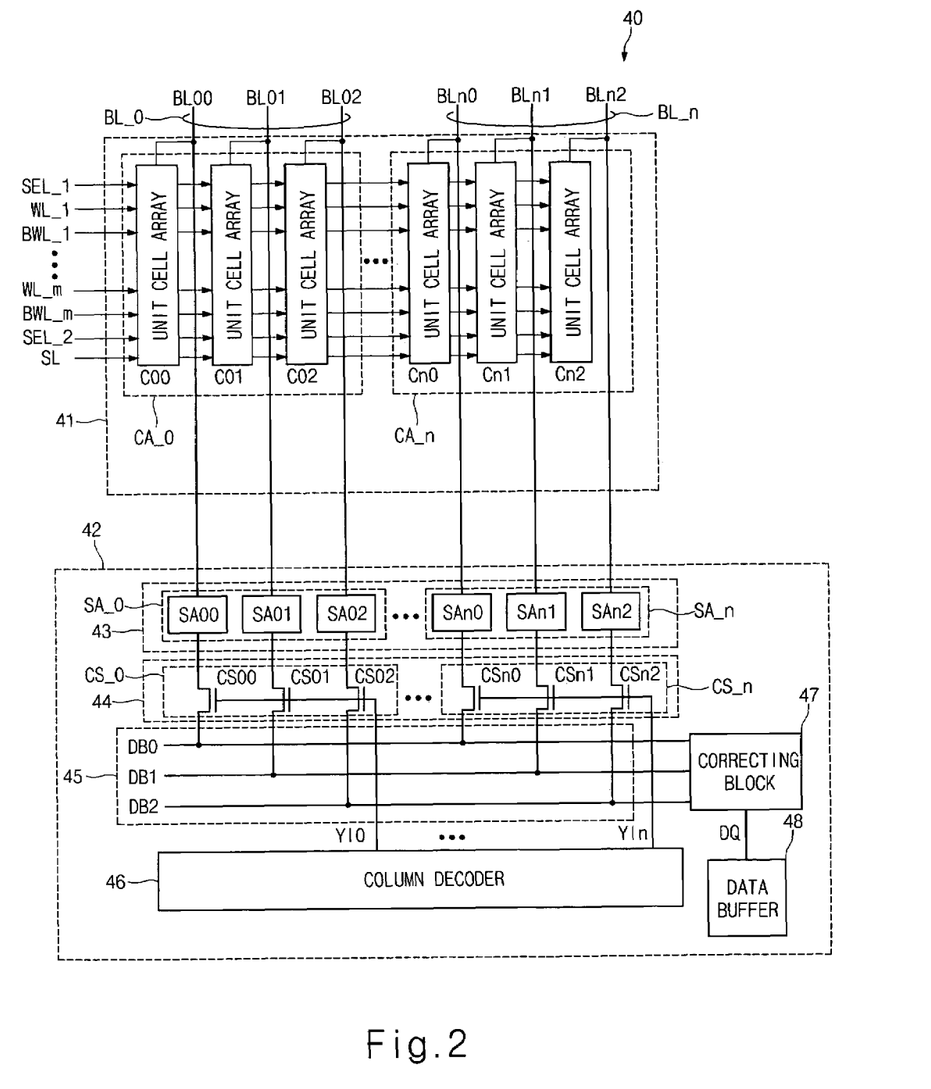
FIG. 2 is a block diagram illustrating a first example of a memory of FIG. 1.

FIG. 2 is a block diagram illustrating a first example of the memory 40 of FIG. 1.

The memory 40 comprises a cell array block 41 and a failed cell correcting block 42.

The memory cell block 41 comprises a plurality of cell arrays CA_0~CA_n. Each of the cell arrays CA_0~CA_n includes three unit cell arrays C00, C01, C02~Cn0, Cn1, Cn2. The unit cell arrays C00, C01, C02~Cn0, Cn1, Cn2 are connected one by one to bit lines BL00, BL01, BL02~BLn0, BLn1, BLn2. Here, each of bit line groups BL_0~BL_n includes the bit lines BL00, BL01, BL02~BLn0, BLn1, BLn2.

The failed cell correcting block 42 comprises a sense amplifier block 43, a column switch block 44, a data bus 45, a column decoder 46, a correcting block 47 and a data buffer 48.

The sense amplifier block 43 includes sense amplifier arrays SA_0SA_n corresponding one by one to the bit line groups BL_0~BL_n. Here, each of the sense amplifier arrays SA_0~SA_n includes three sense amplifiers SA00, SA01, SA02~SAn0, SAn1, SAn2.

The column switch block 44 includes column switch arrays CS_0~CS_n configured to selectively connect the data bus group 45 to the sense amplifier arrays SA_0~SA_n of the sense amplifier block 43 in response to column selecting signals YI0~YIn.

Here, each of the column switch arrays CS_0~CS_n includes three column switches CS00, CS01, CS02~CSn0, CSn1, CSn2 configured to have a control terminal for receiving the column selecting signals YI0~YIn and to selectively connect data buses DB0, DB1, DB2 of the data bus group 45 to the sense amplifiers SA00, SA01, SA02~SAn0, SAn1, SAn2 of the sense amplifier arrays SA_0~SA_n.

The column decoder 46 generates the column selecting signals YI0~YIn for controlling switching operations of the column switches CS00, CS01, CS02~CSn0, CS01, CSn2 depending on a column address.

The correcting block 47 compares data on the data buses DB0, DB1, DB2 of the data bus group 45 to output the same data as output data "DQ" to the data buffer 48, and apply data applied from the data buffer 48 to the data bus group 45. The data buffer 48 buffers the output data "DQ" applied from the correcting block 47 or buffers input data.

Figure 3:
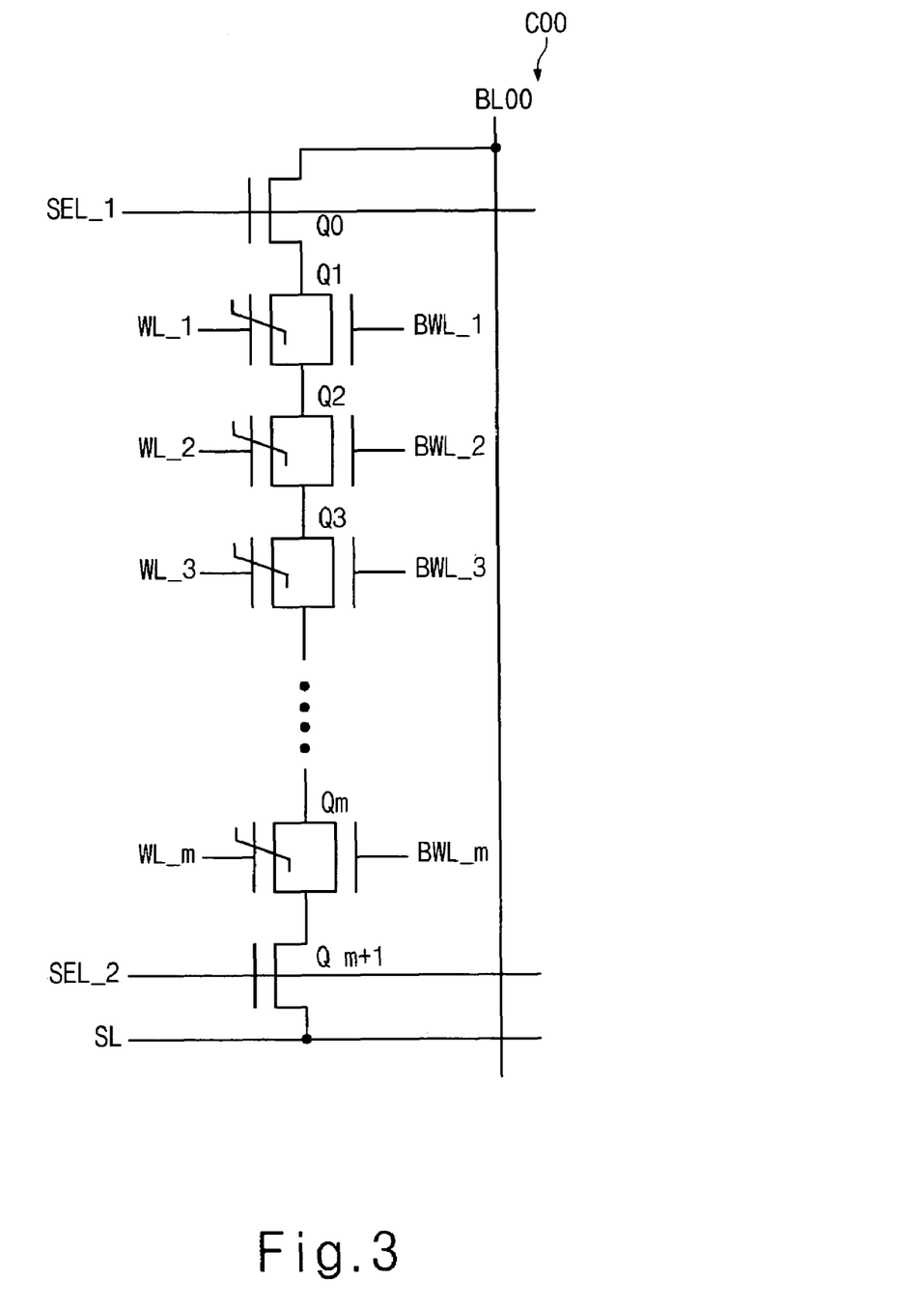
FIG. 3 is a circuit diagram illustrating a unit cell array of FIG. 2.

FIG. 3 is a circuit diagram illustrating the unit cell array C00 of FIG. 2.

The unit cell array C00 comprises switching elements Q0, Qm+1 and a plurality of double gate memory cells Q1~Qm. Here, the switching element Q0 has a control terminal to receive a selecting signal SEL_1 and selectively connects the memory cell Q1 to the bit line BL00. The switching element Qm+1 has a control terminal to receive a selecting signal SEL_2 and selectively connects the memory cell Qm to a sensing line SL.

In the double gate memory cell Q1~Qm, bottom word lines BWL_1~BWL_m formed on the bottom layer are arranged in parallel with word lines WL_1~WL_m formed on the top layer. Here, the bottom word lines BWL_1~BWL_m and the word lines WL_1~WL_m are selectively driven by a row address decoder (not shown).

An oxide layer is formed on each of the bottom word lines BWL_1~BWL_m, and a floating channel layer consisting of a P-type channel region is formed on the oxide layer.

A ferroelectric layer is formed on the floating channel layer, and the word lines WL_1~WL_m are formed on the ferroelectric layer. Here, the floating channel layer has a drain and a source which are a N-type semiconductor, and a channel region which is a P-type semiconductor. The semiconductor of the floating channel layer are formed of materials such as carbon nano tube, silicon and Ge.

The double gate memory cells Q1~Qm read and write data using a characteristic where channel resistance of the floating channel layer is differentiated depending on a polarization state of the ferroelectric layer. That is, when a polarity of the ferroelectric layer induces a positive charge to the channel region, the memory cells Q1~Qm become at a high resistance state to turn off the channel. On the other hand, when the polarity of the ferroelectric layer induces a negative charge to the channel region, the memory cells Q1~Qm become at a low resistance state to turn on the channel.

Figure 4:
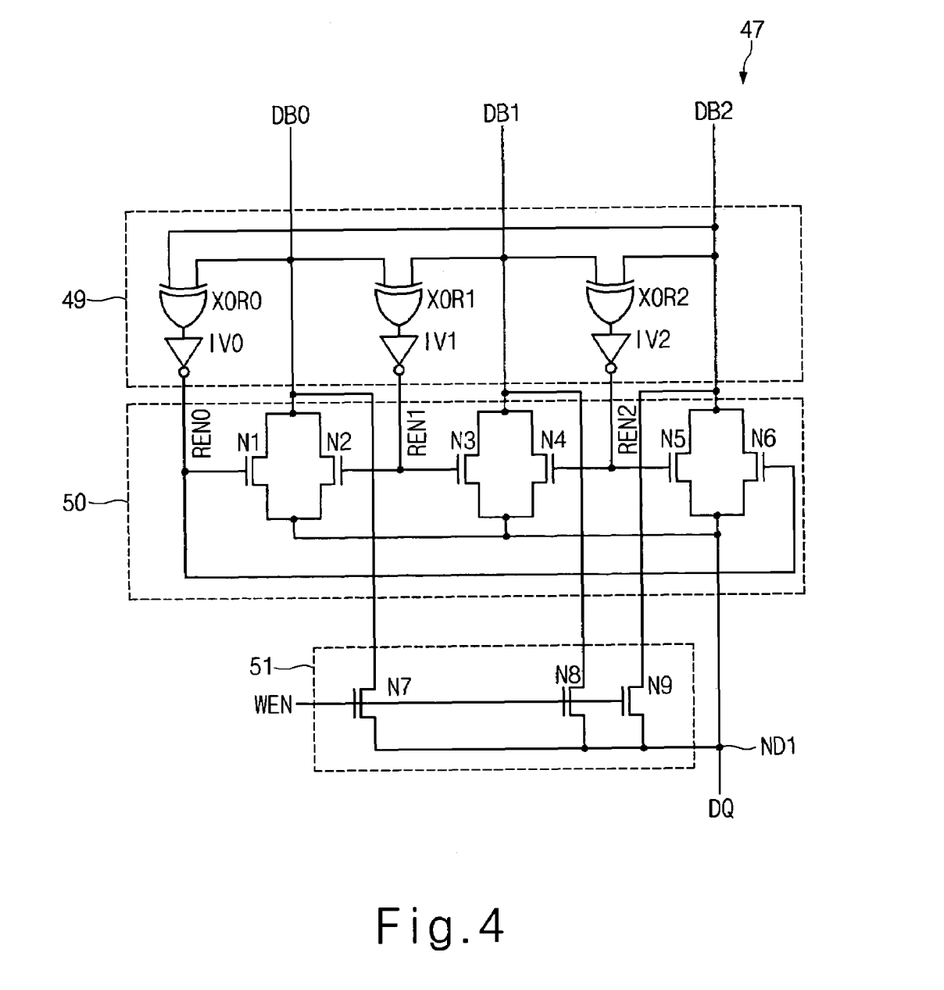
FIG. 4 is a circuit diagram illustrating a correcting block of FIG. 2.

FIG. 4 is a circuit diagram illustrating the correcting block 47 of FIG. 2.

The correcting block 47 comprises a comparison unit 49, a data output switching unit 50 and a data input switching unit 51.

Here, the comparison unit 49 comprises exclusive OR gates XOR0~XOR2 and inverters IV0~IV2.

The exclusive OR gate XOR0 identifies whether data on the data buses DB0 and DB2 are the same. The inverter IV0 inverts an output signal from the exclusive OR gate XOR0 to output a comparison output signal REN0.

The exclusive OR gate XOR1 identifies whether data on the data buses DB0 and DB1. The inverter IV1 inverts an output signal from the exclusive OR gate XOR1 to output a comparison output signal REN1.

The exclusive OR gate XOR2 identifies whether data on the data buses DB1 and DB2 are the same. The inverter IV2 inverts an output signal from the exclusive OR gate XOR2 to output a comparison output signal REN2.

The data output switching unit 50 comprises NMOS transistors N1~N6.

The NMOS transistors N1 and N6 have control terminals to receive the comparison output signal REN0, and selectively transmit data on the data buses DB0 and DB2, respectively. The NMOS transistors N2 and N3 have control terminals to receive the comparison output signal REN1, and selectively transmit data on the data buses DB0 and DB1, respectively. The NMOS transistors N4 and N5 have control terminals to receive the comparison output signal REN2, and selectively transmit data on the data buses DB1 and DB2, respectively.

The data input switching unit 51 comprises NMOS transistors N7~N9.

Here, the NMOS transistors N7~N9 have control terminals to receive a write enable signal WEN, and selectively transmit the inputted data DQ to the data buses DB0~DB2.

Figure 5:
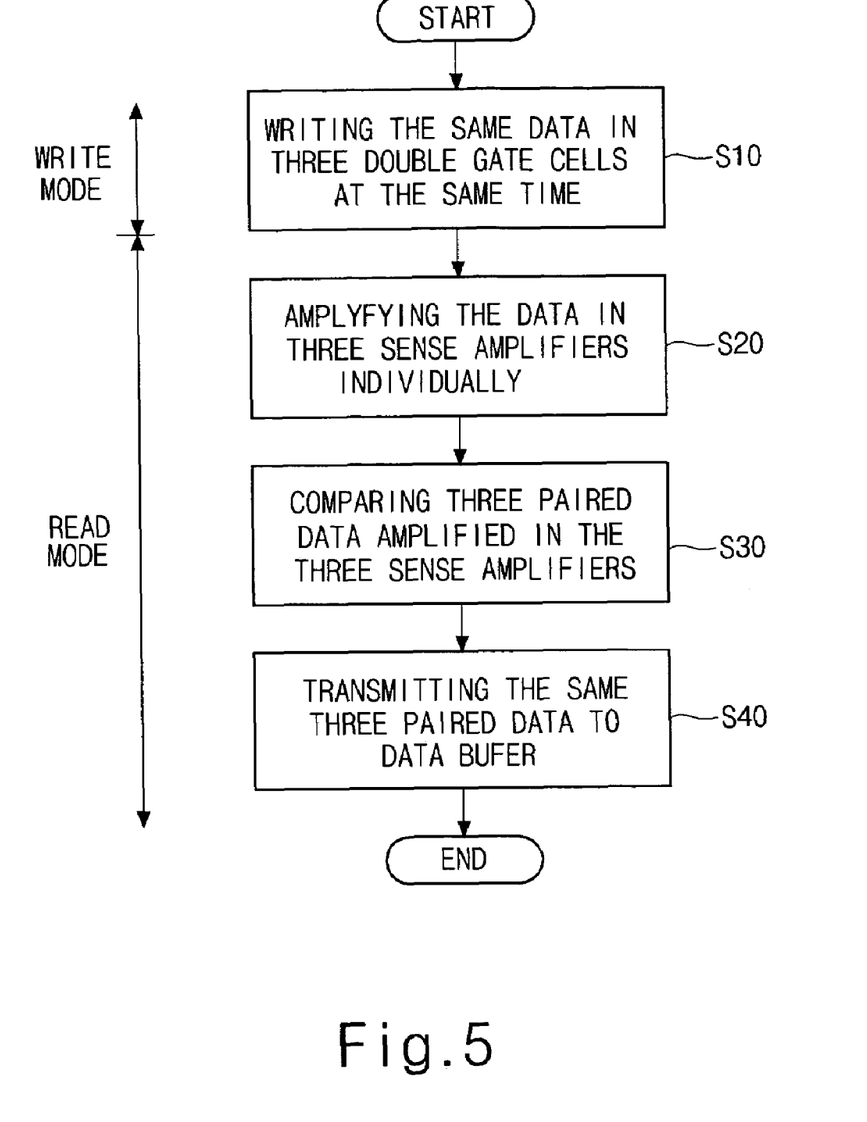
FIG. 5 is a flow chart illustrating the operation of the first example of FIG. 2.

FIG. 5 is a flow chart illustrating the operation of the first example of FIG. 2.

The operation of the first example is divided into a write mode and a read mode. At a write mode, the write enable signal WEN is activated, so that the NMOS transistors N7~N9 of the data input switching unit 51 are turned on to transmit input data to the data buses D00, D01, D02. Thus, the same effective data are written in the three double gate cells at the same time (step S10).

Meanwhile, at a read mode, the sense amplifiers SA00, SA01, SA02 of the sense amplifier array SA_0 amplify data on the bit lines BL00, BL01, BL02 of the bit line group BL_0, respectively (step S20).

Thereafter, the column switches CS00~CS02 of the column switch array CS_0 are turned on in response to the column selecting signal YI0 outputted from the column decoder 46. As a result, data amplified in the sense amplifiers SA00, SA01, SA02 are outputted to the correcting block 47 through the data buses DB0, DB1, DB2 of the data bus group 45.

Then, the correcting block 47 divides data amplified in the sense amplifiers SA00, SA01, SA02 into 3 pairs each consisting of 2 data, and compares the paired data through the data bus group 45 (step S30). That is, data amplified in the sense amplifiers SA00, SA01, SA02 are divided into three pairs each consisting of 2 data and compared in the comparison unit 49.

The comparison unit 49 identifies whether the paired data of each pair is the same or not. The data output switching unit 50 transmits the compared data to the data buffer 48 when the two sets of data are the same, and does not transmit the compared data when the two sets of data are different.

When the two sets of data of the data amplified in the sense amplifiers SA00, SA01, SA02 are the same and the other sets of data are different, the correcting block 47 determines that the same two sets of data are effective and outputs the same data to the data buffer 48.

More specifically, in the comparison unit 49 of FIG. 3, the exclusive OR gate XOR0 performs an exclusive OR operation on data on the data buses DB0 and DB2 to identify whether the two sets of data are the same. As a result, the exclusive OR gate XOR0 outputs a low level signal "0" when the data on the data buses DB0 and DB2 is the same, and outputs a high level signal "1" when the data is different.

The inverter IV0 inverts an output signal from the exclusive OR gate XOR0, and outputs the comparison output signal REN0. Then, the inverter IV0 outputs the comparison output signal REN0 as the high level signal "1" when the data on the data buses D00 and D02 is the same, and outputs the low level signal "0" when the data is different.

Thereafter, when the comparison output signal REN0 is the high level signal, the NMOS transistors N1 and N6 of the switching unit 50 are turned on, so that data on the data buses DB0 and DB2 are applied to a node ND1 and outputted as the output data DQ.

The exclusive OR gate XOR1 performs an exclusive OR operation on the data on the data buses DB0 and DB1 to identify whether two data are the same. Thus, the exclusive OR gate XOR1 outputs the low level signal "0" when the data on the data buses DB0 and DB1 is the same, and outputs the high level signal "1" when the data is different.

The inverter IV1 inverts an output signal from the exclusive OR gate XOR1 to output the comparison signal REN1. As a result, the inverter IV1 outputs the high level signal "1" when the data on the data buses DB0 and DB1 is the same, and outputs the low level signal "0" when the data is different.

Thereafter, when the comparison output signal REN1 is a high level signal, the NMOS transistors N2 and N3 of the data output switching unit 50 are turned on, so that the data on the data buses DB0 and DB1 are applied to the node ND1 and outputted as the output data DQ.

The exclusive OR gate XOR2 performs an exclusive OR operation on the data on the data buses DB1 and DB2 to identify whether the two sets of data are the same. Thus, the exclusive OR gate XOR2 outputs the low level signal "0" when the data on the data buses DB1 and DB2 is the same, and outputs the high level "1" when the data is different.

The inverter VI2 inverts an output signal from the exclusive OR gate XOR2 to output the comparison output signal REN2. Then, the inverter IV2 outputs the comparison output signal REN as the high level signal "1" when the data on the data buses DB1 and DB2 is the same, and outputs the signal as the low level signal "0" when the data is different.

Thereafter, when the comparison output signal REN2 is a high level signal, the NMOS transistors N4 and N5 of the data output switching unit 50 are turned on, so that data on the data buses DB1 and DB2 are applied to the node ND1 and outputted as the output data DQ.

Then, the correcting block 47 compares data on the data bus group 45 to output the same data to the data buffer 48 (step S40).

TABLE 1

| Write Mode | | | Read Mode | | | |
|---|---|---|---|---|---|---|
| cell data | | | amplified data | | | output data |
| 0 | 0 | 0 | 0 | 0 | 0 | 0 |
| 0 | 0 | 0 | 0 | 0 | 1 | 0 |
| 0 | 0 | 0 | 0 | 1 | 0 | 0 |
| 0 | 0 | 0 | 1 | 0 | 0 | 0 |
| 1 | 1 | 1 | 0 | 1 | 1 | 1 |
| 1 | 1 | 1 | 1 | 0 | 1 | 1 |
| 1 | 1 | 1 | 1 | 1 | 0 | 1 |
| 1 | 1 | 1 | 1 | 1 | 1 | 1 |

As shown in Table 1, even when one of the data amplified in the sense amplifiers SA00, SA01, SA02 has a fail, the output data DQ which are generated depending on the comparison result of the correcting block 47 become identical with data stored in the unit cell arrays C00, C01, C02. As a result, the whole cell data are effectively corrected even when fail cells are generated to about 33%.

Figure 6:
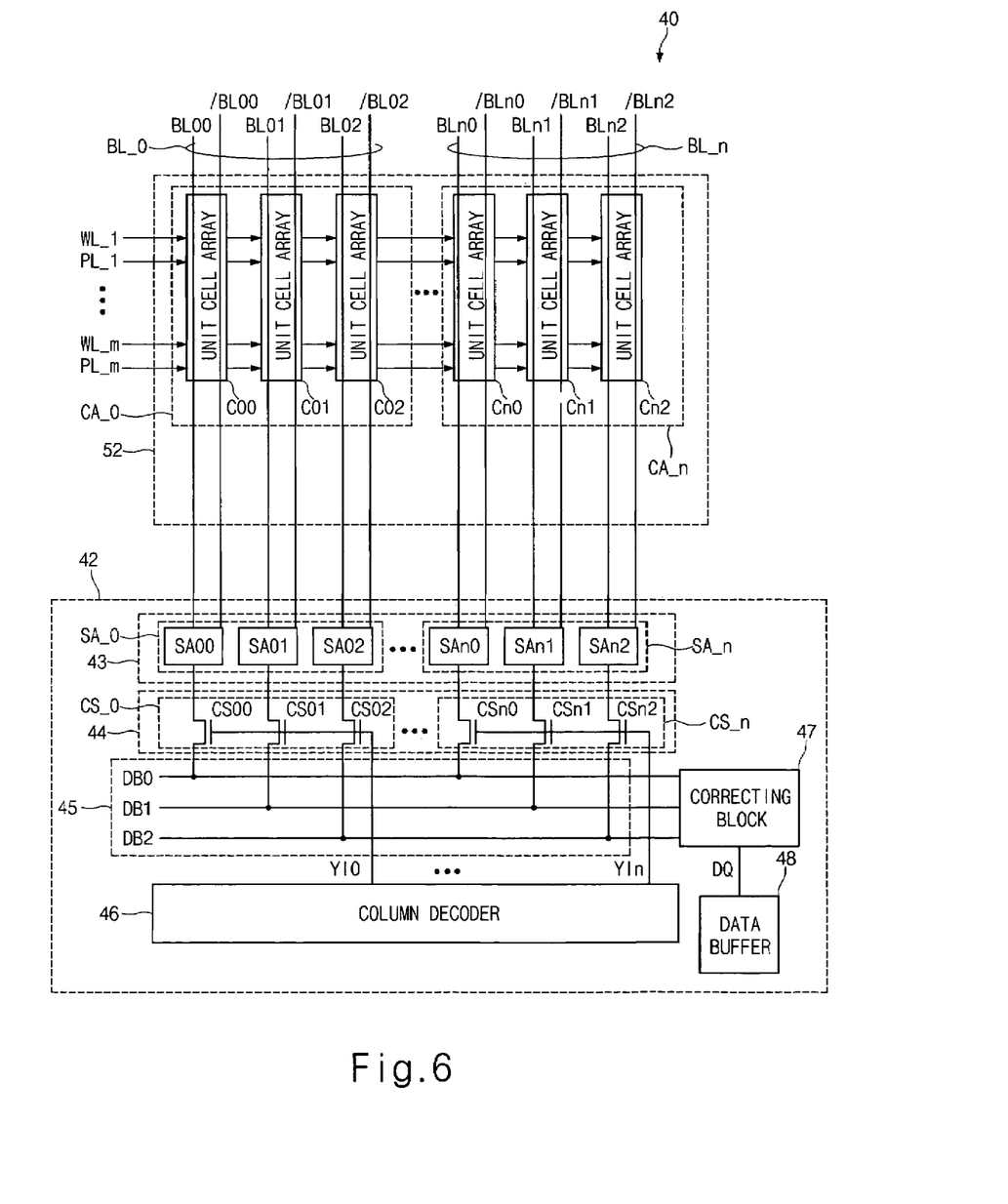
FIG. 6 is a block diagram illustrating a second example of the memory of FIG. 1.

FIG. 6 is a block diagram illustrating a second example of the memory 40 of FIG. 1.

The memory 40 comprises a cell array block 52 and a failed cell correcting block 42.

The cell array block 52 comprises a plurality of cell arrays CA_0~CA_n. Each of the cell arrays $CA_{0 \sim CA\_}n$ includes three unit cell arrays C00, C01, C02~Cn0, Cn1, Cn2, respectively. The three unit cell arrays C00, C01, C02~Cn0, Cn1, Cn2 are connected one by one to paired bit lines BL00, /BL00, BL01, /BL01, BL02, /BL02~BLn0, /BLn0, BLn1, /BLn1, BLn2, /BLn2, respectively. Here, the three paired bit lines BL00, /BL00, BL01, /BL01, BL02, /BL02 BLn0, /BLn0, BLn1, /BLn1, BLn2, /BLn2 are included in the bit line groups BL_0~BL_n.

The failed cell correcting circuit 42 comprises a sense amplifier block 43, a column switch block 44, a data bus 45, a column decoder 46, a correcting block 47 and a data buffer 48.

The sense amplifier block 43 includes sense amplifier arrays SA_0~SA_n corresponding one by one to the bit line groups BL_0~BL_n. Here, each of the sense amplifier arrays SA_0~SA_n includes three sense amplifiers SA00, SA01, SA02~SAn0, SAn1, SAn2 corresponding one by one to bit line BL00, BL01, BL02~BLn0, BLn1, BLn2.

The column switch block 44 includes column switch arrays CS_0~CS_N configured to selectively connect the data bus group 45 to the sense amplifier arrays SA_0~SA_n of the sense amplifier block 43 in response to column selecting signals YI0~YIn.

Each of the column switch arrays CS_0~CS_n includes three column switches CS00, CS01, CS02~CSn0, CSn1, CSn2 each configured to have a control terminal for receiving the column selecting signals YI0~YIn, respectively and to selectively connect data buses DB0, DB1, DB2 of the data bus group 45 to the sense amplifiers SA00, SA01, SA02 SAn0, SAn1, SAn2 of the sense amplifier arrays SA_0~SA_n.

The column decoder 46 generates the column selecting signals YI0~YIn for controlling switching operations of the column switches CS00, CS01, CS02~CSn0, CSn1, CSn2 depending on a column address.

The correcting block 47 compares data one the data buses DB0, DB1, DB2 of the data bus group 45 to output the same data DQ to the data buffer 48, and applies data applied from the data buffer 48 to the data bus group 45. The data buffer 48 buffers the output data DQ applied from the correcting block 47 or buffers input data.

Figure 7:
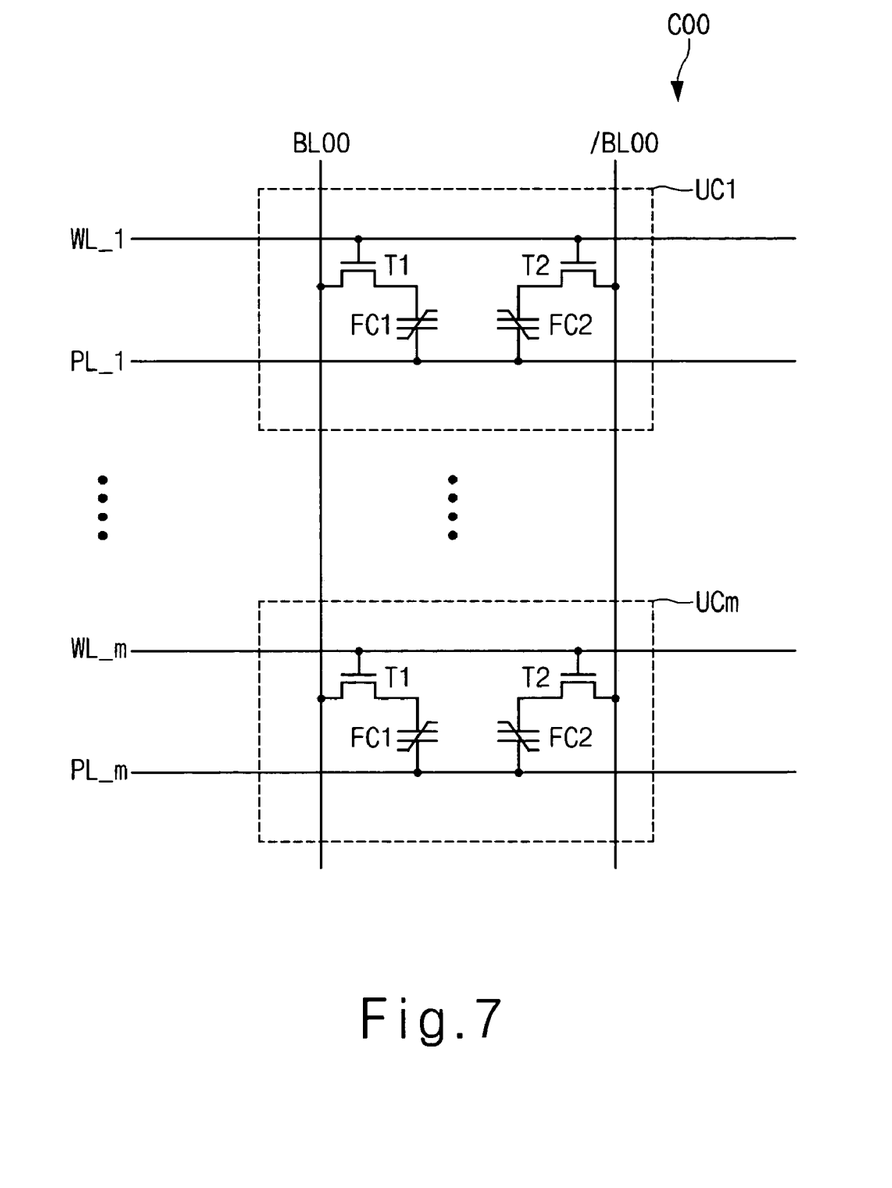
FIG. 7 is a circuit diagram illustrating a unit cell array of FIG. 6.

FIG. 7 is a circuit diagram illustrating the unit cell array C00 of FIG. 6.

The unit cell array C00 includes a plurality of unit cells UC1~UCm. Here, each of the unit cells UC1~UCm comprises two NMOS transistors T1, T2, and two ferroelectric capacitors FC1, FC2.

The NMOS transistors T1 and T2 are configured to have control terminals connected to word lines WL_1~WL_m, and to selectively connect one terminal of the ferroelectric capacitors FC1, FC2 to the paired bit lines BL00, /BL00 depending on a voltage applied to the word lines WL_1~WL_m.

The ferroelectric capacitors FC1, FC2 have one terminal connected to the NMOS transistors T1, T2, and the other terminals connected to plate lines PL_1~PL_m.

Otherwise, the operation of the second example of the memory 40 shown in FIG. 6 is substantially similar to that of the memory 40 shown in FIG. 2.

As described above, a RFID system according to an embodiment of the present invention compares cell data stored in a double gate cell of a nonvolatile ferroelectric memory device to effectively process the cell data randomly distributed, thereby improving yield of the RFID system.

The foregoing description of various embodiments of the invention has been presented for purposes of illustration and description. It is not intended to be exhaustive or to limit the invention to the precise form disclosed, and modifications and variations are possible in light of the above teachings or may be acquired from practice of the invention. Thus, the embodiments were chosen and described in order to explain the principles of the invention and its practical application to enable one skilled in the art to utilize the invention in various embodiments and with various modifications as are suited to the particular use contemplated.

What is claimed is:

1. A radio frequency identification (RFID) system, comprising:
    an analog block configured to transmit data to an external communication apparatus and receive data from said external communication apparatus;
    a digital block configured to receive a power voltage and a signal for data transmission from the analog block, and to transmit a response signal to the analog block;
    a memory configured to store a first data in a memory group consisting of a predetermined number of unit cells having the same address at a write mode, and to correct cell data of said memory group selected at a read mode to output the corrected cell data as effective data, wherein the first data is stored in each unit cell; and a correction unit configured to compare cell data in said each memory group and to output the corrected cell data as effective data, wherein the correction unit compares the first data stored in the predetermined number of unit cells, and transmits the compared first data out when the compared first data are the same, and does not transmits the compared first data out when the compared first data are different.

2. The RFID system according to claim 1, wherein the memory comprises:
    a plurality of memory cell arrays each including the predetermined number of unit cells connected serially; and.

3. The RFID system according to claim 2, wherein each of the plurality of memory cell arrays further comprises:
    a first switch configured to selectively connect the predetermined number of unit cells to a plurality of bit lines arranged in a column direction in response to a first selecting signal; and
    a second switch configured to selectively connect the predetermined number of unit cells to a sensing line in response to a second selecting signal.

4. The RFID system according to claim 3, wherein the unit cell comprises:
    a first gate connected to a word line;
    a second gate connected to a bottom word line;
    a ferroelectric layer configured to store data or output the stored data depending on voltages applied to the first gate and the second gate; and
    a float channel layer in which channel is formed depending on a polarity of the ferroelectric layer.

5. The RFID system according to claim 2, wherein the correction unit comprises:
    a plurality of sense amplifiers configured to amplify data of the unit cell;
    a plurality of column switches configured to selectively transmit data amplified in the plurality of sense amplifiers in response to a column selecting signal; and
    a first comparison unit configured to identify whether the data amplified in the plurality of sense amplifiers is identical to output the compared data.

6. The RFID system according to claim 5, further comprising a column decoder configured to generate a plurality of the column selecting signals for controlling the column switch configured to selectively transmit data amplified in the sense amplifier corresponding to said each memory group in response to a column address.

7. The RFID system according to claim 5, wherein the first comparison unit comprises:
    a plurality of second comparison units configured to identify whether data amplified in the sense amplifier corresponding to said each memory group is identical; and
    a plurality of data output switch units configured to selectively transmit the identical data in response to an output signal from the corresponding second comparison unit.

8. The RFID system according to claim 7, wherein the first comparison unit further comprises a plurality of data input switch units configured to selectively transmit externally inputted data in response to a write enable signal.

9. The RFID system according to claim 7, wherein each second comparison unit comprises an exclusive OR gate.

10. The RFID system according to claim 7, wherein each of the plurality of data output switch units comprises a plurality of transistors configured to have a control terminal for receiving an output signal from the plurality of second comparison units and to selectively transmit data amplified in the sense amplifier.

11. The RFID system according to claim 2, wherein each unit cell comprises:
   a first switch unit and a second switch unit each configured to have a control terminal connected to a word line and to selectively transmit cell data to a pair of bit lines, respectively; and
   a first ferroelectric capacitor and a second ferroelectric capacitor each configured to have one terminal connected to a plate line and the other terminal connected to the first switch unit and the second switch unit, respectively.

12. The RFID system according to claim 11, wherein the correction unit comprises:
   a plurality of sense amplifiers configured to amplify data of the unit cell;
   a plurality of column switches configured to selectively transmit data amplified in each of the plurality of sense amplifiers in response to the column selecting signal; and
   a first comparison unit configured to identify whether the data amplified in each of the plurality of sense amplifiers are identical and to output the identical data.

13. The RFID system according to claim 12, further comprising a column decoder configured to generate a plurality of the column selecting signals for controlling the column switch configured to selectively transmit data amplified in the sense amplifier corresponding to the memory group in response to a column address.

14. The RFID system according to claim 12, wherein the first comparison unit comprises:
   a plurality of second comparison units configured to identify whether data amplified in each of the plurality of sense amplifiers corresponding to each of the memory groups are identical; and
   a plurality of data output switch units configured to selectively transmit the identical data in response to an output signal from the comparison unit.

15. The RFID system according to claim 14, wherein the first comparison unit further comprises a plurality of data input switch units configured to selectively transmit externally inputted data in response to a write enable signal.

16. The RFID system according to claim 14, wherein each second comparison unit comprises an exclusive OR gate.

17. The RFID system according to claim 14, wherein each of the data output switch units comprises a plurality of transistors configured to have a control terminal for receiving an output signal from each of the plurality of second comparison units and to selectively transmit data amplified in each of the plurality of sense amplifiers.

18. A method for correcting a failed cell of a RFID system, the RFID system comprising an analog block configured to transmit data to an external communication apparatus and receive data from said external communication apparatus; a digital block configured to receive a power voltage and a signal for data transmission from the analog block, and to transmit a response signal to the analog block; and a memory configured to receive the memory control signals and to correct the failed cell, the method comprising:
   a writing step of writing a first data in a memory group including a predetermined number of unit cells having the same address, wherein the first data is written to each unit cell; and
   a correcting step of correcting data stored in the memory group to output the corrected data as effective data, wherein the first data stored in the predetermined number of unit cells are compared with other, when the compared first data are the same then outputs the compared first data as effective data, and does not output the compared first data when the compared first data are different.

19. The method according to claim 18, wherein the correcting step comprises:
   sensing and amplifying the written data in the selected memory group;
   comparing the amplified data; and
   outputting the corrected data as effective data depending on the comparison result.

20. The method according to claim 18, wherein each of the predetermined number of unit cells is a double gate cell.

* * * * *